(12) United States Patent
Kim et al.

(10) Patent No.: US 10,073,271 B2
(45) Date of Patent: Sep. 11, 2018

(54) WEARABLE ELECTRONIC DEVICE

(71) Applicants: Samsung Electronics Co., Ltd., Suwon-si, Gyeonggi-do (KR); INDUSTRIAL EDUCATION COOPERATION ORGANIZATION, DAEGU HEALTH COLLEGE, Daegu (KR)

(72) Inventors: Jin-Ho Kim, Hanam-si (KR); Jun-Young Jang, Daegu (KR); Lae-Kyoung Kim, Yongin-si (KR); Hyo-Seok Han, Hwaseong-si (KR)

(73) Assignees: Samsung Electronics Co., Ltd., Suwon-si (KR); Industrial Education Cooperation Organization Daegu Health College, Daegu (KR)

( * ) Notice: Subject to any disclaimer, the term of this patent is extended or adjusted under 35 U.S.C. 154(b) by 0 days.

(21) Appl. No.: 14/939,512

(22) Filed: Nov. 12, 2015

(65) Prior Publication Data
US 2016/0131913 A1    May 12, 2016

(30) Foreign Application Priority Data
Nov. 12, 2014 (KR) .......................... 10-2014-0157259

(51) Int. Cl.
| | |
|---|---|
| *G02B 27/01* | (2006.01) |
| *G06F 3/041* | (2006.01) |
| *G02C 11/00* | (2006.01) |
| *G02C 5/14* | (2006.01) |
| *G02C 5/22* | (2006.01) |
| *G02C 5/20* | (2006.01) |

(52) U.S. Cl.
CPC ........... *G02B 27/0176* (2013.01); *G02C 5/20* (2013.01); *G02C 11/10* (2013.01); *G02B 2027/015* (2013.01); *G02B 2027/0138* (2013.01); *G02B 2027/0178* (2013.01)

(58) Field of Classification Search
CPC ...... G02B 27/0176; G02C 5/20; G02C 11/10; G06F 3/041
USPC ........................................................ 359/630
See application file for complete search history.

(56) References Cited

U.S. PATENT DOCUMENTS

| | | | |
|---|---|---|---|
| 8,223,024 B1 | 7/2012 | Petrou | |
| 8,335,040 B2 * | 12/2012 | Mukawa | G02B 27/0172 345/8 |
| 9,436,009 B1 * | 9/2016 | Bhardwaj | G02B 27/017 |
| 9,519,157 B2 * | 12/2016 | Spindelbalker | G02C 5/2209 |
| 2013/0044042 A1 | 2/2013 | Olsson et al. | |
| 2013/0069787 A1 | 3/2013 | Petrou | |
| 2013/0069985 A1 | 3/2013 | Wong et al. | |

(Continued)

FOREIGN PATENT DOCUMENTS

| | | |
|---|---|---|
| JP | 2011-160166 A | 8/2011 |
| KR | 10-2012-0139241 A | 12/2012 |

*Primary Examiner* — William R Alexander
*Assistant Examiner* — Grant Gagnon
(74) *Attorney, Agent, or Firm* — Jefferson IP Law, LLP (57) ABSTRACT

A wearable electronic device is provided. The wearable electronic device includes a frame, a body section connected with the frame, a display module mounted on the body section and configured to output an image, and a guide section configured to change a position of the display module in relation to the frame. The wearable electronic device may be variously implemented according to various embodiments.

17 Claims, 7 Drawing Sheets

(56) References Cited

U.S. PATENT DOCUMENTS

| | | | |
|---|---|---|---|
| 2013/0176626 A1 | 7/2013 | Heinrich et al. | |
| 2013/0235331 A1* | 9/2013 | Heinrich ................ | G02C 11/10 351/158 |
| 2014/0253867 A1* | 9/2014 | Jiang ..................... | G02C 11/10 351/158 |

* cited by examiner

WEARABLE ELECTRONIC DEVICE

CROSS-REFERENCE TO RELATED APPLICATION(S)

This application claims the benefit under 35 U.S.C. § 119(a) of a Korean patent application filed on Nov. 12, 2014 in the Korean Intellectual Property Office and assigned Serial No. 10-2014-0157259, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) INDUSTRIAL EDUCATION COOPERATION ORGANIZATION, DAEGU HEALTH COLLEGE.

TECHNICAL FIELD

The present disclosure relates to an electronic device. More particularly, the present disclosure relates to an electronic device which is wearable on a part of a body.

BACKGROUND

The term "electronic device" denotes a device that performs specific functions according to programs incorporated therein, such as an electronic scheduler, a portable multimedia reproducer, a mobile communication terminal, a tablet personal computer (PC), an image/sound device, a desktop/laptop computer, or a vehicular navigation system, including a home appliance. For example, such an electronic device may output information stored therein as a sound or an image. As the integration of electronic devices has increased and a super-high speed and large capacity wireless communication has been popularized, various functions have recently been incorporated in a single mobile communication terminal. For example, in addition to a communication function, an entertainment function such as a game, a multimedia function, such as music/video image reproduction, a communication and security function for, e.g., mobile banking, and a function of schedule management or an electronic wallet, are integrated in a single electronic device.

Electronic devices that are to be used in a portable manner, such as an electronic scheduler, a portable multimedia reproducer, a mobile communication terminal, and a tablet PC, are generally equipped with a flat display device and a battery, and have a bar-type, a folder-type, or a sliding-type appearance due to the shape of the display device or the battery. Recently, as display devices and batteries have been miniaturized with the advancement in performance thereof, electronic devices wearable on a part of a body, such as a wrist or a head, have appeared.

In order to allow an electronic device to be carried or worn on a part of a body, miniaturization, weight-reduction, and wearing-suitable shape design of the electronic device, and a battery with a sufficient capacity may be needed.

The above information is presented as background information only to assist with an understanding of the present disclosure. No determination has been made, and no assertion is made, as to whether any of the above might be applicable as prior art with regard to the present disclosure.

SUMMARY

Some commercially available wearable electronic devices of the related art are configured such that an input/output device is worn on a part of a body and a main circuit device or a battery is configured as a separate modular form. The circuit device or the battery configured as a separate modular form may be connected with the input/output device via a wire. Since this type of electronic device is usually used in a restricted environment, such as an indoor space, the electronic device is inconvenient for use while being carried.

A head-wearable electronic device (head mounted display (HMD)) includes a circuit device or a battery mounted in a frame corresponding to ordinary eyeglass temples so that the frame has a non-foldable structure. Due to this, the head-wearable electronic device may be poor in portability and storability.

In addition, a focus for projecting a virtual image may vary depending on a user's facial features and the positions of the user's eyes. Thus, there may be a limit in providing a uniform display quality to all individual users.

Aspects of the present disclosure are to address at least the above-mentioned problems and/or disadvantages and to provide at least the advantages described below. Accordingly, an aspect of the present disclosure is to provide a wearable electronic device improved in wearability.

Another aspect of the present disclosure is to provide a wearable electronic device improved in portability and storability.

Another aspect of the present disclosure is to provide a wearable electronic device capable of optimizing a focus depending on the user's facial features and the positions of the user's eyes.

In accordance with an aspect of the present disclosure, a wearable electronic device is provided. The wearable electronic device may include a frame, a body section connected with the frame, a display module mounted on the body section and configured to output an image, and a guide section configured to change a position of the body section in relation to the frame.

The wearable electronic device may further include a lens installed on the frame. The image output from the display module may be formed on the lens.

The frame may include a first frame connected with the body section, a second frame pivotally coupled to the first frame, and a first hinge pivotally coupling the first frame and the second frame to each other.

The guide section may include a guide recess formed in the body section, and an inserting portion extending from the frame and inserted into the guide recess.

In accordance with another aspect of the present disclosure, a guide section of the wearable electronic device is provided. The guide section may include a first sliding unit extending along a longitudinal direction of the body section, and a second sliding unit connected to the display module configured to be slid along the first sliding unit.

According to various embodiments of the present disclosure, the wearable electronic device may provide an improved wearing feeling to the user since its components, such as the lens, the circuit board, and the battery are arranged to be properly dispersed, Since the frame has a foldable structure, the portability and storability of the wearable electronic device can be improved. As the positions of the display module and the lens are relatively changed, a focus may be optimized according to a user's body type (e.g., the user's facial features and positions of the user's eyes).

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features. In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure. It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them.

As used herein, the term "user" may indicate a person who uses an electronic device or a device (e.g., an artificial intelligence electronic device) that uses an electronic device.

Figure 1:
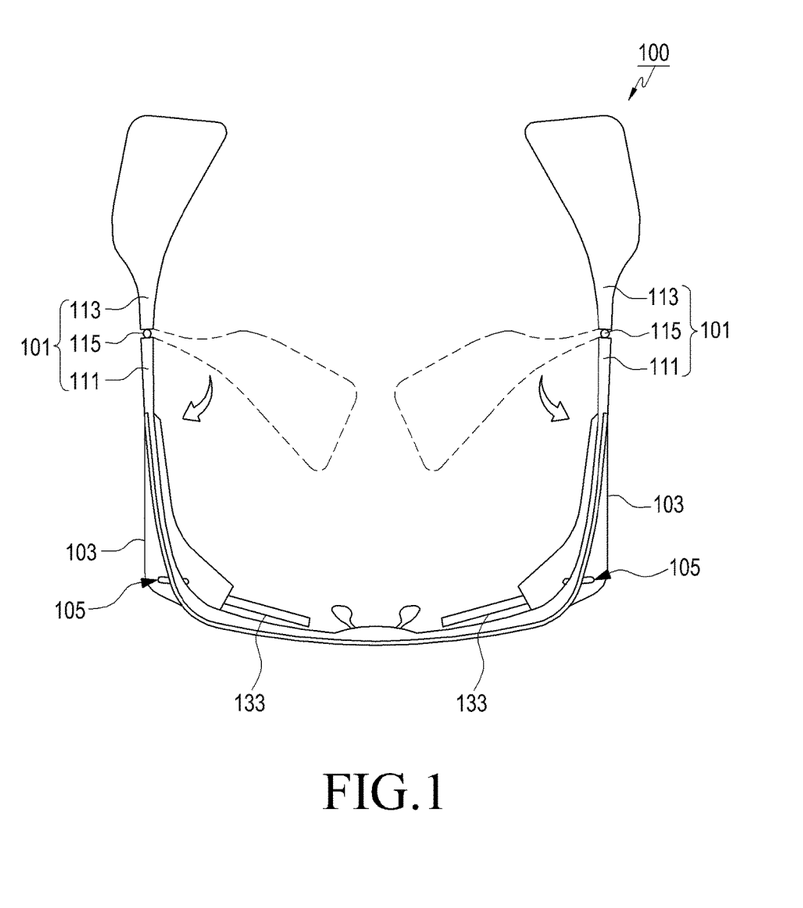
FIG. 1 is a plan view illustrating a wearable electronic device according to an embodiment of the present disclosure.
Figure 2:
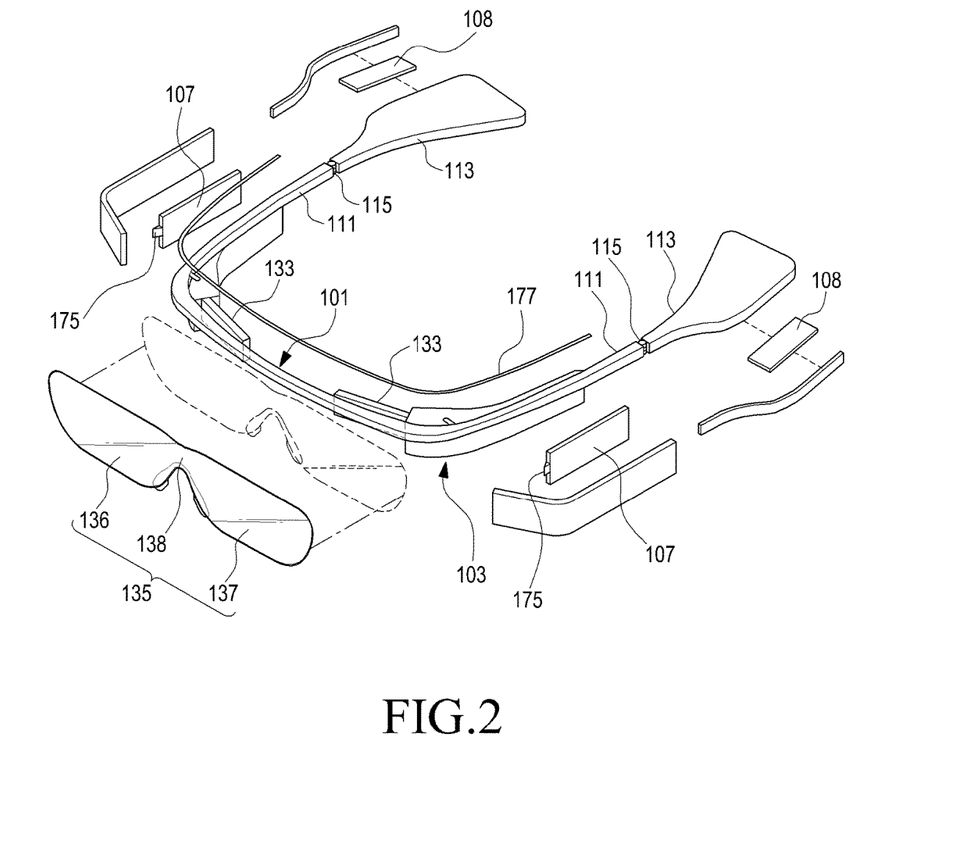
FIG. 2 is an exploded perspective view illustrating a wearable electronic device according to an embodiment of the present disclosure.

FIG. 1 is a plan view illustrating a wearable electronic device according to an embodiment of the present disclosure. FIG. 2 is an exploded perspective view illustrating a wearable electronic device according to an embodiment of the present disclosure.

Referring to FIGS. 1 and 2, according to various embodiments of the present disclosure, a wearable electronic device 100 may include a frame 101, a pair of body sections 103, a pair of display modules 133, and a pair of guide sections 105.

The frame 101 may have a structure capable of being in contact with or being seated on a part of a user's body. The frame 101 may provide a function of rims and temples of an ordinary eyeglass structure.

The frame 101 may include a first frame 111, a second frame 113, and a first hinge 115. The first frame 111 has a shape at least partially enclosing a part of the user's body (e.g., face), and is connected to the body section 103 to be capable of supporting the body section 103. The second frame 113 may be pivotally coupled to the first frame 111. The second frame 113 extends from opposite ends of the first frame 111 in parallel so as to provide means for allowing the user to wear the electronic device 100 on a part of the user's body, for example, the head. The second frame 113 may provide the function of the temples of an ordinary eyeglass structure. For example, the first frame 111 is positioned on the user's facial portion and opposite side portions of the facial portion, and the second frame 113 may be seated on the user's ears at the opposite sides of the user's head. The first hinge 115 may pivotally connect the first frame 111 and the second frame 113. As a result, the second frame 113 may be pivoted with respect to the first frame 111 to be folded. Consequently, the space occupied by the wearable electronic device 100 can be reduced so that the portability and the storability can be enhanced.

The body section 103 may be connected to the frame 101. For example, the body section 103 may be connected to the first frame 111. The body section 103 may accommodate a circuit board 107 and a sensor 175 which will be described later.

The display module 133 may be mounted on the body section 103. The display module 133 may directly project an image on the user's view line, for example, to the user's eyes. While the present embodiment exemplifies a configuration in which one pair of display modules 133 are disposed, only one display module 133 may be disposed. The display module 133 may be provided with, e.g., a display device such as a liquid display device or an organic light emitting diode (LED), and a light source so as to output an image.

The guide section 105 may change a position of the body section 103 in relation to the frame 101. For example, the guide section 105 may allow the frame 101 or the body section 103 to be moved in relation to each other so that the relative position of the body section 103 can be changed in relation to the frame 101. As a result, the guide section 105 may relatively change the position of the display module 133 mounted on the body section 103 in relation to the frame 101. When the relative position of the display module 133 in relation to the frame 101 is changed using the guide section 105, the focus of the image output from the display module 133 may be optimized depending on, e.g., the various facial features and positions of eyes of the users. A description on the structure of the guide section 105 will be made later with reference to the drawings.

According to an embodiment of the present disclosure, the wearable electronic device 100 may further include a lens 135 mounted on the frame 101. For example, the image output from the display module 133 may be formed on the lens 135.

The lens 135 mounted on the frame 101 may be located in the user's line of sight, for example, in front of the user's eyes. The lens 135 may include a first lens 136, a second lens 137, and a lens connection member 138. The first lens 136 may be located in the line of sight of one of the user's eyes. The second lens 137 may be located in the line of sight of the other of the user's eyes. The lens connection member 138 may connect the first lens 136 and the second lens 137 with each other. The first and second lenses 136 and 137 and the lens connection member 138 may include a material similar to that of ordinary eyeglasses and an electrochromic material layer. The electrochromic material layer may be formed of an electrochromic material, such as a tungsten oxide ($WO_3$), a molybdenum oxide, a titanium oxide ($TiO_3$), a vanadium oxide ($V_2O_5$), an iridium oxide ($IrO_2$), a niobium oxide ($NbO_5$), or a nickel oxide (NiO), or a combination thereof. Upon receiving a voltage applied thereto, the electrochromic material layer may adjust the coloring concentration of the lens 135 so as to adjust a light transmittance.

According to an embodiment of the present disclosure, the wearable electronic device 100 may further include the circuit board 107, a battery 108, and a circuit wiring 177.

The circuit board 107 may be provided as a main circuit board that includes a driving circuit of the display modules 133, a control circuit for adjusting the coloring concentration of the lens 135, and a processor for processing, for example, image information. The circuit board 107 may also be provided as an auxiliary circuit board, on which an interface with the user, a communication circuit and various connectors that may be connected with another electronic device or a commercial communication network, and the sensor module 175 may be mounted. Furthermore, there may be a plurality of circuit boards 107 and sensor modules 175 provided. Similarly, there may be a plurality of batteries 108 provided. In addition, a microphone for inputting sounds and a speaker for outputting sounds may also be placed on or adjacent to the circuit board 107. Of course, the circuit arrangement of the circuit board 107 and functions obtained thereby are not limited to those described above, and may be variously adjusted as needed. For example, the sensor module 175 may be mounted on the circuit board 107. The circuit board 107 as described above may be mounted on the body section 103. The sensor module 175 may include, for example, a proximity sensor, an illumination sensor, a gyro sensor, a camera module, a view line tracer, a geomagnetic sensor, an accelerometer, etc. and any of the various sensors that may form the sensor module 175 do not necessarily have to be limited to those mounted on the circuit board 107. For example, the camera module may be mounted on the body section 103 at a suitable position on the body section 103 to be capable of being close to the user's view line, for example, at a position adjacent to the lens 135. The sensor module 175 described above may detect information related to a peripheral environment required for setting an optimal use environment while monitoring the use environment of the wearable electronic device 100. For example, the illumination sensor incorporated in the sensor module 175 may detect a peripheral illuminance so as to provide information required for adjusting the coloring concentration of the lens 135 or the brightness or resolution of the display module 133. When arranging the illumination sensor, the illumination sensor may be mounted at a position closest to the user's eyes, e.g., at a position around the lens 135 on the frame 101 such that the illumination sensor can detect the illuminance closest to the peripheral illuminance felt by the user.

The battery 108 may serve to provide electric power to, e.g., the circuit board 107 and the display module 133 and may be accommodated in the second frame 113. Furthermore, if a plurality of batteries 108 are provided, they may be accommodated in one or both of the second frames 113.

In addition, the first frame 111 and the second frame 113 may have a constant thickness. In addition, the thickness of the second frame 113 may correspond to the thickness of the battery 108. For example, the battery 108 may be accommodated in the second frame 113 in a laid-down state rather than in an erected state. That is, the area of the second frame 113 unnecessarily in contact with the user can be reduced compared with a structure in which the battery 108 is accommodated in the erected state so that the wearing feeling of the wearable electronic device can be improved.

The circuit wiring 177 may be wired through the frame 101 so as interconnect, e.g., the circuit board 107 which is mounted on the body section 103. The circuit wiring 177 may provide a transmission/reception path of various control signals and data between the main circuit board and the auxiliary circuit board, and may also provide a transmission/reception path of control signals of the lens 135 and the display module 133. The functions and roles of the circuit wiring 177 may be variously changed. In a case where a plurality of circuit wirings 177 are provided, the number of the circuit wirings 177 may be variously adjusted. The circuit wiring 177 may be configured using a coaxial cable, and may have various types of transmission line structure, such as a flexible printed circuit board (FPCB).

The electronic device 100 may be configured having a plurality of display modules 133. In that case, one display module 133 may be arranged to face one of the first and second lenses 136 and 137. Alternatively, one pair of display modules 133 may be arranged to face the first and second lenses 136 and 137, respectively. In addition, in terms of the weight ratio, the left and right portions of the wearable electronic device 100 may be symmetric to each other with reference to the central portion of the frame 101 where the first and second lenses 136 and 137 are mounted, i.e. a bridge in the case of an ordinary eyeglass structure. For example, the weight ratio of the left and right portions of may be 5:5. In addition, assuming that the portion where the first frame 111 is positioned is defined as a front portion of the wearable electronic device 100 and the portion where the second frame 113 is positioned is defined as a rear portion, the weight ratio of the front portion and the rear portion of the wearable electronic device 100 may be 5:5 to 6:4. This is enabled by properly dispersing the arrangement of the lens 135, the display modules 133, the circuit board 107, and the battery 108, especially if there is a plurality of one or more of these components. Through the weight dispersion structure, the weight of the wearable electronic device 100 may be prevented from being concentrated at a specific position when the user wears the wearable electronic device 100 so that the wearing feeling of the wearable electronic device 100 can be improved.

Figure 3:
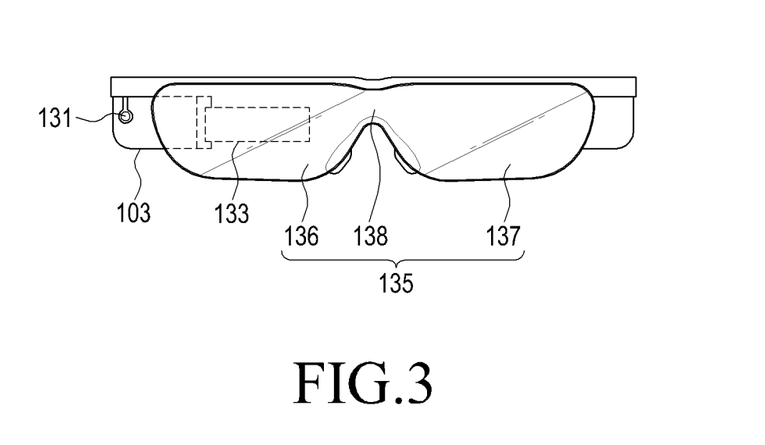
FIG. 3 is a front view illustrating a wearable electronic device according to an embodiment of the present disclosure.
Figure 4:
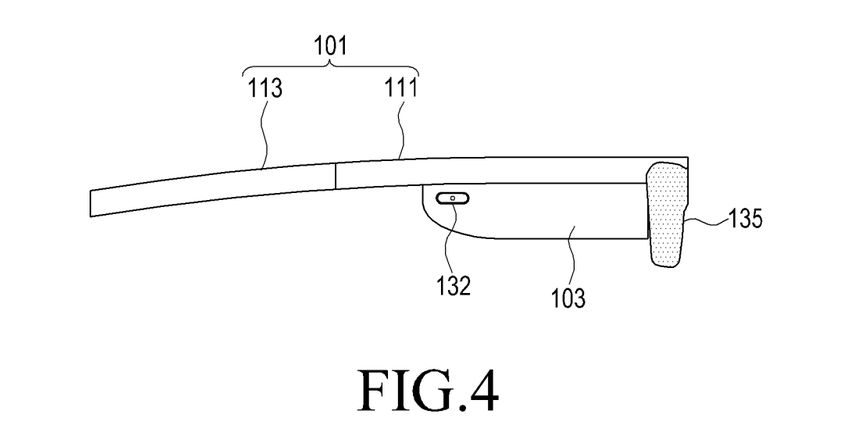
FIG. 4 is a side view illustrating a wearable electronic device according to an embodiment of the present disclosure.

FIG. 3 is a front view illustrating a wearable electronic device according to an embodiment of the present disclosure. FIG. 4 is a side view illustrating a wearable electronic device according to an embodiment of the present disclosure.

Referring to FIGS. 3 and 4, according to various embodiments of the present disclosure, the wearable electronic device 100 may include a camera module 131 and a touch pad 132.

As described above, the camera module 131 may be mounted on one of the circuit boards 107. Without being limited thereto, the camera module 131 may be electrically connected with the circuit board 107 and positioned in front of one of the body sections 103. In addition, in front of the body sections 103 where the camera module 131 is positioned, various sensor modules may be positioned without being limited to the camera module 131.

The touch pad 132 may be mounted on the body section 103 to be electrically connected with the circuit board 107. The touch pad 132 may protrude to the outside of the body section 103 so as to generate an input signal through the user's direct touch. The touch pad 132 may be configured using an optical touch pad module. Then, the touch pad 132 may generate an input signal not only by the user's contact, but also the user's gesture so that a desired menu may be selected and executed on the screen recognized by the user or shift the screen.

Figure 5:
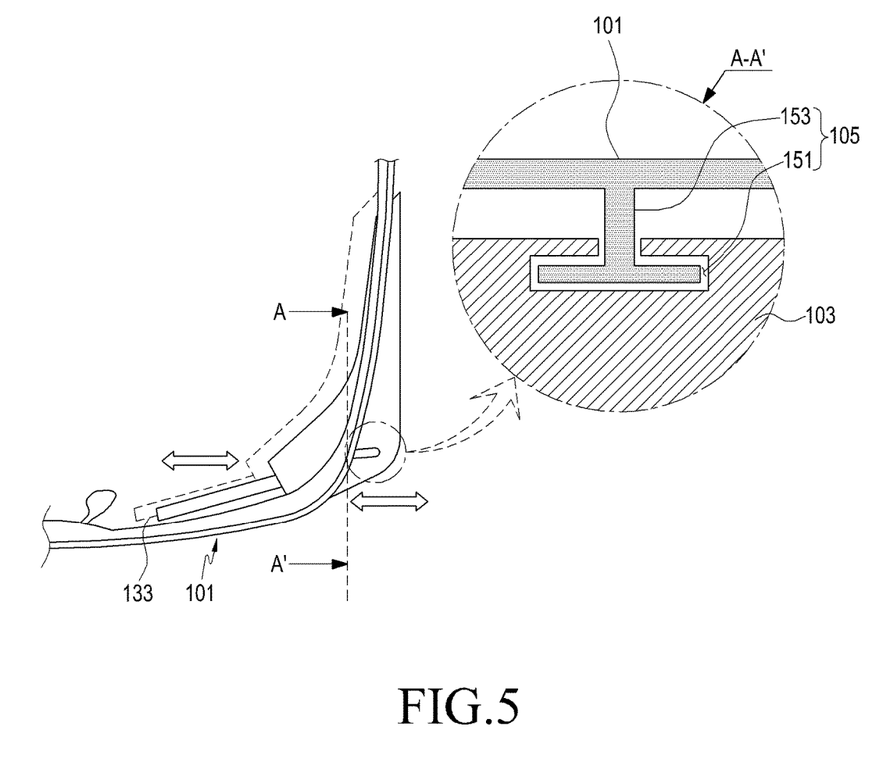
FIG. 5 is a plan view illustrating a guide section of a wearable electronic device according to an embodiment of the present disclosure.

FIG. 5 is a plan view illustrating a guide section of a wearable electronic device according to an embodiment of the present disclosure.

Referring to FIG. 5, the guide section 105 may include a guide recess 151 formed on the body section 103 and an inserting portion 153 extending from the frame 101 to be inserted into the guide recess 151.

The guide recess 151 may be formed on the body section 103 adjacent to the first frame 111. The guide recess 151 may have a slit shape in the outside of the body section 103. The inserting portion 153 may extend from the frame 101 toward the guide recess 151. In addition, one end of the inserting portion 153 may be inserted into the corresponding guide recess 151. The inserting portion 153 is movable along the longitudinal direction of the guide recess 151. According to the movement of the inserting portion 153, the position of the frame 101 may be relatively changed in relation to the body section 103. For example, since the positions of the display modules 133 mounted on the body section 103 are adjustable depending on the positions of the user's eyes, the guide section 105 may optimize the focus according to the user's face or the positions of the user's eyes. In an embodiment, while the inserting portion 153 is described as being movable, the movement is a relative movement of two coupled members, for example, the frame 101 and the body section 103, in which the body section 103 formed with the guide recess 151 may be moved in relation to the frame 101. That is, when the relative position between the frame 101 and the body section 103 is changed, the relative positions between the display modules 133 and the positions of the user's eyes may be changed so as to adjust the focus of the image output from the display module 133.

Figure 6:
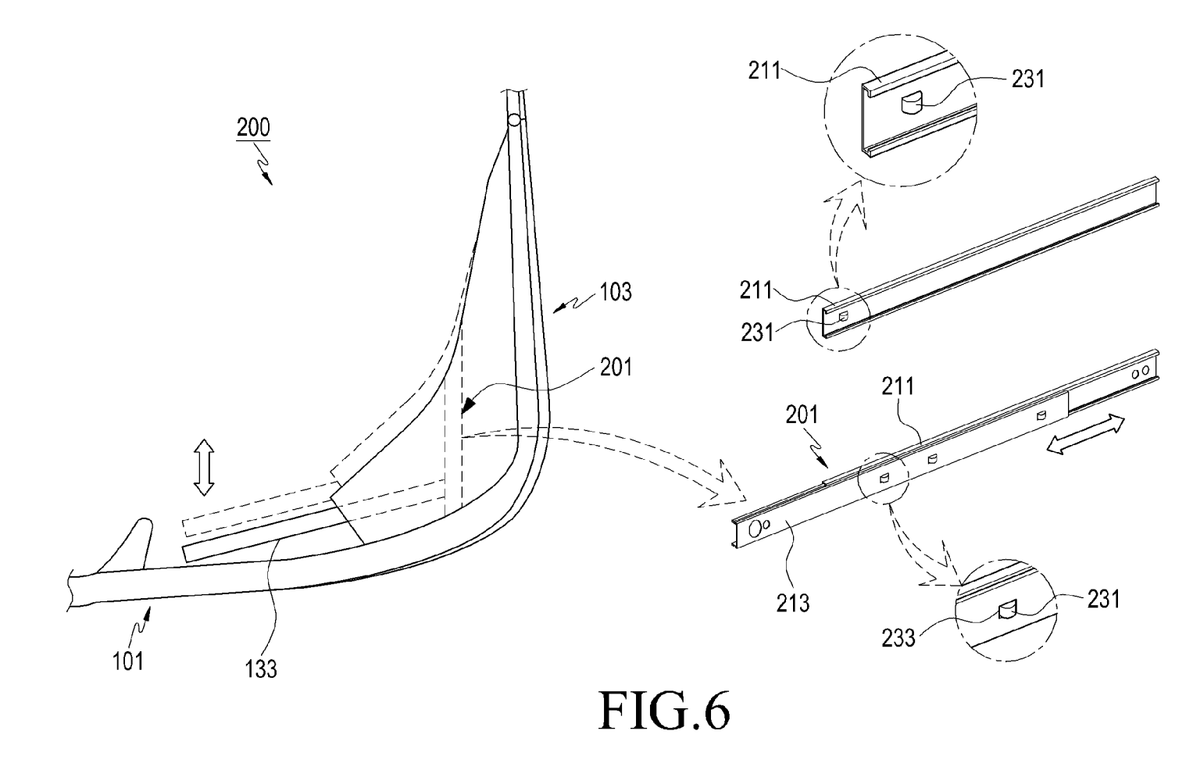
FIG. 6 is a plan view illustrating a guide section of a wearable electronic device according to an embodiment of the present disclosure.

FIG. 6 is a plan view illustrating a guide section of a wearable electronic device according to an embodiment of the present disclosure.

Referring to FIG. 6, according to another embodiment of the present disclosure, a guide section 201 of a wearable electronic device 200 may include a first sliding unit 211 and a second sliding unit 213. The first sliding unit 211 is provided on a body section 103 and may extend along the longitudinal direction. The first sliding unit 211 may be formed in a direction intersecting with the longitudinal direction of the guide recess 151 of the preceding embodiment, for example, in a direction perpendicular to the longitudinal direction of the guide recess 151. The second sliding unit 213 is coupled with the first sliding unit 211 to be slid along the direction where the first sliding unit 211 extends. The second sliding unit 213 is connected to the display module 133, and when the second sliding unit 213 is slid by being guided by the first sliding unit 211, the position of the display module 133 may be relatively changed in relation to the body section 103, and further in relation to the frame 101.

According to various embodiments, the display module 133 may be mounted in a state where it is fixed to the body section 103. When the display module 133 is fixed to the body section 103, the body section 103 is made to be movable in relation to the frame 101 so that the relative position of the display module 133 in relation to the frame 101 can be adjusted. For example, when the first sliding unit 211 is mounted on the frame 101 and the second sliding unit 213 is mounted on the body section 103, the body section 103 and the display module 133 fixed to the body section 103 can be moved in relation to the frame 101 by being guided by the first and second sliding units 211 and 213.

In addition, when the guide section 105 of the preceding embodiment and the guide section 201 of the present embodiment are applied to the wearable electronic device 200 in combination, the wearable electronic device 200 may move the display module 133 in the forward, reward, left and right positions in relation to the frame 101 so that the focus of an output image can be optimized depending on various users' facial features or positions of the eyes of the users.

The wearable electronic device 200 including the first and second sliding units 211 and 213 may further include a first stop portion 231 and a second stop portion 233.

The first stop portion 231 may be formed on the first sliding unit 211. The second stop portion 233 may be provided on the second sliding unit 213. The second sliding unit 213 may be formed with a plurality of second stop portions 233. The plurality of second stop portions 233 may be arranged at regular intervals. However, the plurality of second stop portions 233 are not limited to those arranged at regular intervals, and the intervals between adjacent second stop portions 233 may be differently set. The second stop portions 233 may be engaged with the first stop portion 231. For example, as the second sliding units 213 are moved, the first stop portion 231 may be selectively engaged with one of the second stop portions 233. As illustrated in FIG. 6, the first stop portion 231 may be formed by a lug. In addition, the first stop portion 231 may be a leaf spring installed to protrude from one surface of the first sliding unit 211. However, the first stop portion 231 is not limited to the lug or the leaf spring and may take various forms that are elastic and protrude. The second stop portions 233 may be formed by openings having a shape corresponding to the shape of the first stop portion 231. As the first and second sliding units 211 and 213 are slid in relation to each other, the first stop portion 231 may be engaged in one of the openings that form the second stop portions 233. As the first stop portion 231 is engaged in one of the openings that form the second stop portions 233, the first sliding unit 211 may be maintained in the state where it is fixed at a predetermined position on the second sliding unit 213.

Figure 7:
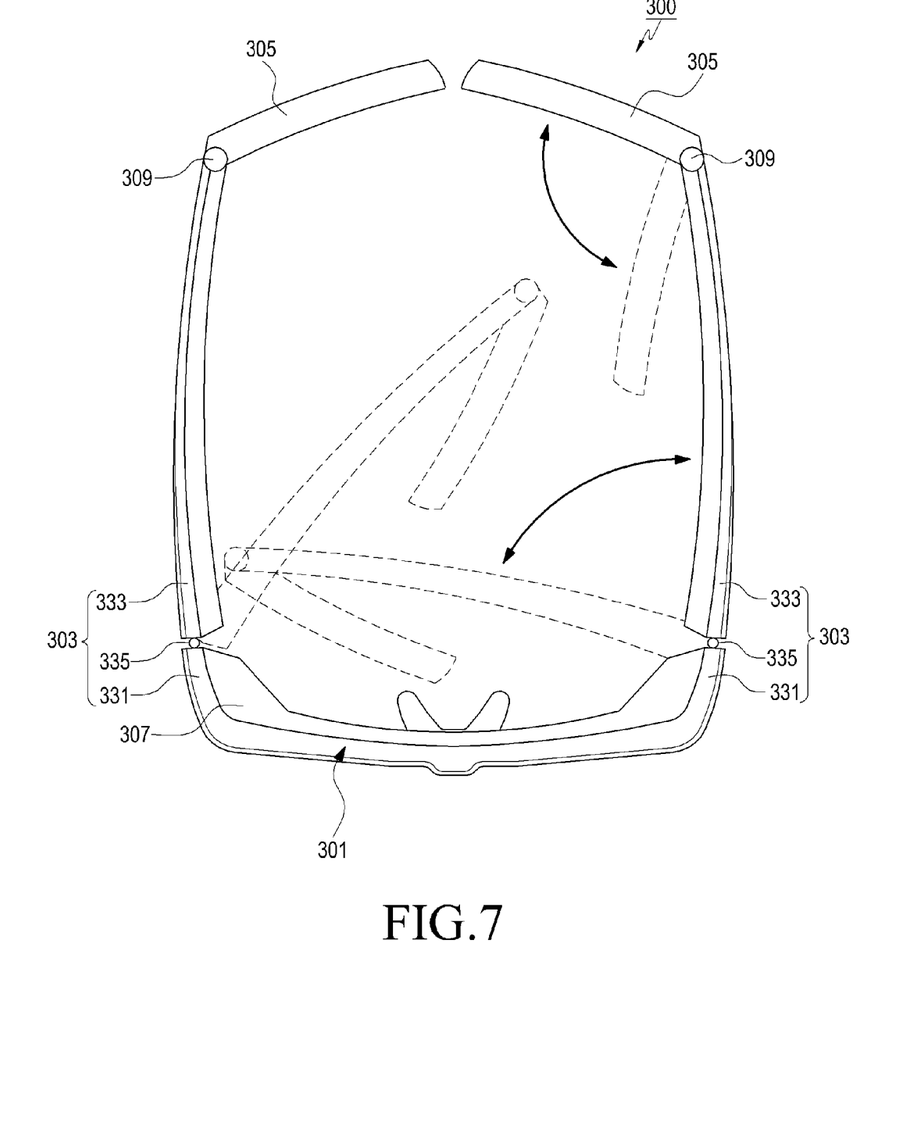
FIG. 7 is a front view illustrating a wearable electronic device according to an embodiment of the present disclosure.

FIG. 7 is a front view illustrating a wearable electronic device according to an embodiment of the present disclosure.

Referring to FIG. 7, according to an embodiment of the present disclosure, a frame 301 applied to a wearable electronic device 300 may include a pair of first frames 303 and a pair of second frames 305, and each of the first frames 303 may include a front frame 331, a side frame 333, and a hinge 335.

Each front frame 331 may be placed adjacent to one of display modules 307 so as to support the display module 307. The side frames 333 may extend from the opposite ends of the front frames 331 in parallel to each other. The side frames 333 may be pivotally coupled to the front frames 331, respectively. The side frames 333 may be equipped with a circuit board, a sensor module, or a camera module, similarly to the body sections described above. The second hinges 335 may pivotally connect the front frames 331 and the side frames 333 with each other, respectively. As a result, each first frame 303 including the front frame 331 and the side frame 333 may be folded so that the storability and portability of the wearable electronic device 300 can be improved. In addition, each of the second frames 305 may be pivotally coupled to one end of one of the first frames 303. Each second frame 305 may be equipped with a battery. In addition, as the first hinges 309 are provided between the first frames 303 and the second frames 305, respectively, so that the frame 301 can be folded, the storability and portability of the wearable electronic device 300 can be improved.

Figure 8:
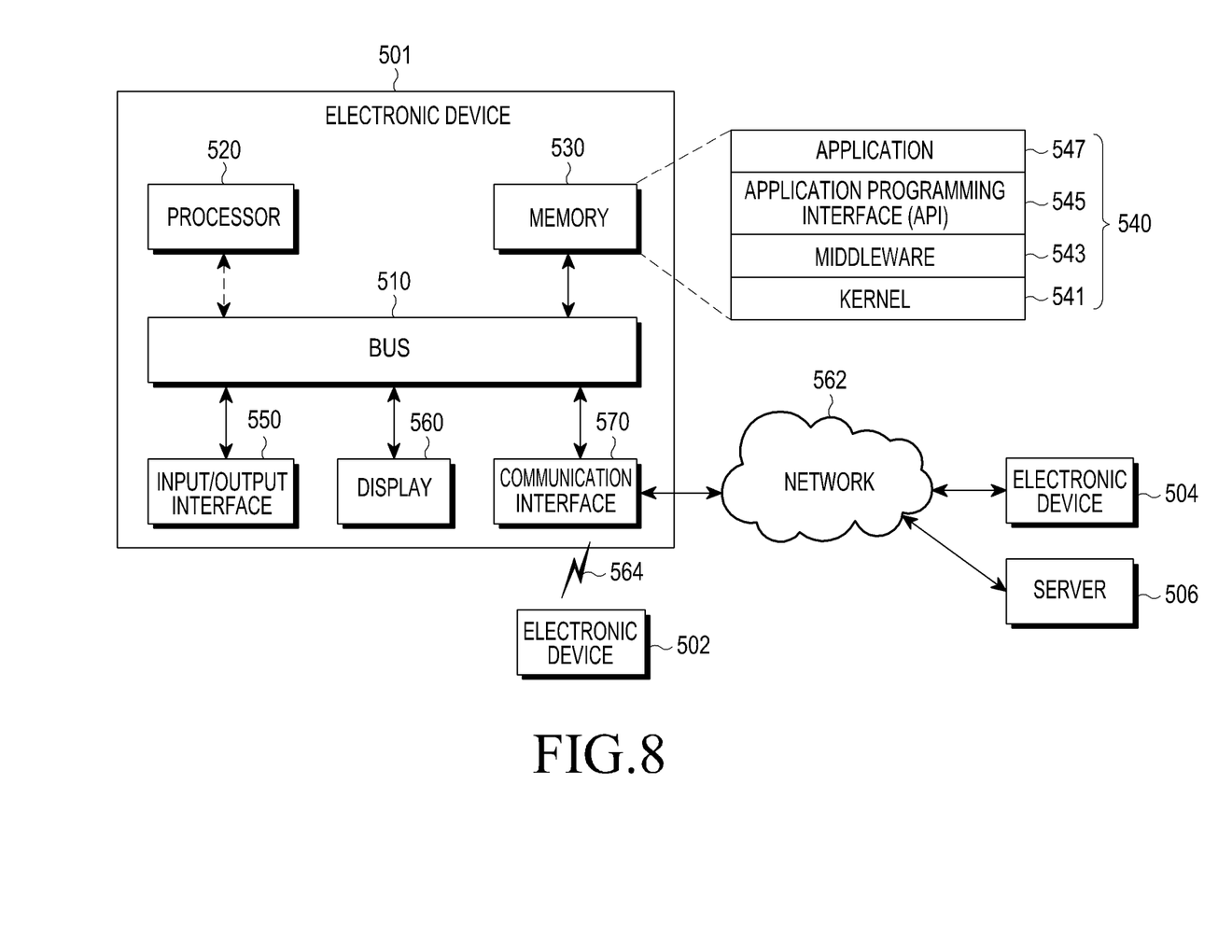
FIG. 8 is a view illustrating a network environment in which the wearable electronic device according to various embodiments of the present disclosure is operated.

FIG. 8 is a view illustrating a network environment in which a wearable electronic device according to various embodiments of the present disclosure is operated.

Referring to FIG. 8, an electronic device according to an embodiment of the present disclosure may include a wearable display device, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group 1 or 2 (MPEG-1 or MPEG-2) audio layer 3 (MP3) player, a mobile medical device, a camera, an electronic cloth, an electronic bracelet, an electronic necklace, an electronic appcessory, an electronic tattoo, a smart mirror, and a smart watch.

According to another embodiment, the electronic device may be a smart home appliance. The home appliance may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices.

As illustrated in FIG. 8, the electronic device 501 may include a bus 510, a processor 520, a memory 530, an input/output interface 550, a display 560, and a communication interface 570. In a certain embodiment, at least one of the components may be omitted from the electronic device 501 or the electronic device 501 may be additionally provided with another component.

The bus 510 may include a circuit that connects the above-discussed elements 510 to 570 and transmits communication (e.g., a control message and/or data) between the components.

The processor 520 may include one or more of a central processing unit (CPU), an application processor (AP), and a communication processor (CP). The processor 520 may execute, for example, an arithmetic operation or data processing related to a control and/or communication of one or more other components of the electronic device 501.

The memory 530 may include a volatile memory and/or a non-volatile memory. The memory 530 may store therein, for example, commands or data related to one or more components of the electronic device 501. According to one embodiment, the memory 530 may store therein software and/or a program 540. The program 540 may include, for example, a kernel 541, a middleware 543, an application programming interface (API) 545, and/or an application program (or an "application") 547. At least some of the kernel 541, the middleware 543, and the API 545 may be referred to as an operating system (OS).

The kernel 541 may control or manage system resources (e.g., the bus 510, the processor 520, or the memory 530) used for executing operations or functions implemented the other programs (e.g., the middleware 543, the API 545, or the application program 547). In addition, the kernel 541 may provide an interface that allows the middleware 543, the API 545, or the applications 547 to access individual components of the electronic device 501 so as to control or manage the system recourses.

The middleware 543 may play an intermediary role such that the API 545 or the application program 547 may communicate with the kernel 541 so as to exchange data. In addition, in connection with task requests received from the application program 547, the middleware 543 may perform a control (e.g., scheduling or load balancing) for the task requests by using, for example, a method of assigning the priority capable of using a system resource of the electronic device 501 (e.g., the bus 510, the processor 520, or the memory 530) to at least one of the applications 547.

The API 545 is an interface for allowing the applications 547 to control functions provided by the kernel 541 or the middleware 543 and may include, for example, at least one interface or function (e.g., commands) for a file control, a window control, an image processing, or a text control, for example.

The input/output interface 550 may serve as an interface capable of delivering commands or data, entered by a user or an external device to the other component(s) of the electronic device 501. Also, the input/output interface 550 may output commands or data received from the other component(s) of the electronic device 501 to the user or the external device.

The display 560 may include, for example, a liquid crystal display (LCD), an LED display, an Organic LED (OLED) display, a microelectromechanical systems (MEMS) display, or an electronic paper display. The display 560 displays various contents (e.g., text, image, video, icon, or symbol) to, for example, the user. The display 560 may include a touch screen, and may receive a touch input, a gesture input, a proximity input or a hovering input using, for example, an electronic pen or a part of the user's body.

The communication interface 570 may set, for example, a communication between the electronic device 501 and an external electronic device (e.g., a first external electronic device 502, a second external device 504, or a server 506). For example, the communication interface 570 may communicate with the external device (e.g., the second external electronic device 504 or the server 506) by being connected with a network 562 through a wired or wireless communication. Further, the communication interface 570 may communicate with the external device 502 through a wireless communication 564.

The wireless communication may use at least one of, for example, long term evolution (LTE), LTE-advanced (LTE-A), code division multiple access (CDMA), wideband CDMA (WCDMA), universal mobile telecommunications system (UMTS) wireless broadband (WiBro) and global system for mobile communications (GSM), as a cellular communication protocol, for example. The wired communication may use at least one of, for example, universal serial bus (USB), high definition multimedia interface (HDMI), recommended standard 232 (RS-232)), and plain old telephone service (POTS). The network 562 may include a telecommunication network, for example, at least one of computer network (e.g., local area network (LAN) or wide area network (WAN)), internet, and telephone network.

Each of the first and second external electronic devices 502 and 504 may be a device that is the same or different type with the electronic device 501. According to one embodiment, the server 506 may include a group of one or more servers. According to various embodiments, all or some of the operations executed by the electronic device 501 may be executed by one or more other electronic devices (e.g., the electronic devices 502 and 504 or the server 506). According to one embodiment, in a case where the electronic device 501 should perform a certain function or service automatically or by a request, the electronic device 501 may request some functions associated therewith from the other electronic devices (e.g., the electronic devices 502 and 504 or the server 506) instead of or in addition to executing the function or service by itself. The other electronic devices (e.g., the electronic devices 502 and 504 or the server 506) may execute the requested functions or additional functions, and transmit the results to the electronic device 501. The electronic device 501 may provide the requested functions or services by processing the received results as they are or additionally. For this purpose, for example, a cloud computing technique, a distributed computing technique, or a client-server computing technique, may be used.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A head-wearable electronic device comprising:
   a frame worn on a part of a user's head;
   a body section connected with the frame;
   a display module mounted on the body section and configured to output an image; and
   a guide section configured to change a position of the display module in relation to the frame, wherein the guide section comprises:
   a guide recess formed in the body section; and
   an inserting portion integrally formed with the frame and inserted into the guide recess, wherein the inserting portion is configured to move along the guide recess together with the frame when one end of the inserting portion is inserted inside of the guide recess.

2. The head-wearable electronic device of claim 1, wherein the display module is fixed to the body section, and wherein the guide section moves the display module in relation to the frame as the body section is moved in relation to the frame.

3. The head-wearable electronic device of claim 1, further comprising:
   a plurality of circuit boards accommodated in the body section; and
   a circuit wiring wired through the frame to connect the circuit boards with each other.

4. The head-wearable electronic device of claim 1, further comprising:
   a circuit board accommodated in the body section; and
   at least one of a sensor module or a camera module mounted on the circuit board.

5. The head-wearable electronic device of claim 1, further comprising:
a touch pad mounted on the body section to generate an input signal according to a user's touch.

6. The head-wearable electronic device of claim 1, wherein the frame comprises:
a first frame on which the lens is mounted; and
a second frame pivotally coupled to the first frame,
wherein the display module is located adjacent to the lens to form the image, output from the display module, on the lens, and
wherein, as the display module is moved, the position of the display module is changed in relation to the lens to adjust a focus of the image formed on the lens.

7. The head-wearable electronic device of claim 1, wherein the frame comprises:
a first frame connected with the body section;
a second frame pivotally coupled to the first frame; and
a first hinge pivotally coupling the first frame and the second frame to each other.

8. The head-wearable electronic device of claim 7, further comprising:
a circuit board accommodated in the body section to control the display module; and
a battery accommodated in the second frame to provide electric power to the display module and the circuit board.

9. The head-wearable electronic device of claim 7, wherein the first frame comprises:
a front frame placed adjacent to the display module;
a side frame pivotally coupled to the front frame; and
a second hinge pivotally coupling the front frame and the side frame to each other.

10. The head-wearable electronic device of claim 9, further comprising:
a circuit board accommodated in the side frame and configured to control the display module; and
a battery accommodated in the second frame and configured to provide electric power to the display module and the circuit board.

11. The head-wearable electronic device of claim 1, further comprising:
a lens installed on the frame,
wherein the image output from the display module is formed on the lens.

12. The head-wearable electronic device of claim 11, wherein the lens comprises:
a first lens arranged in a line of sight of one of a user's eyes; and
a second lens arranged in a line of sight of another one of the user's eyes,
wherein the display module is arranged to face one of the first and second lenses, or one pair of display modules are arranged to face the first and second lenses, respectively.

13. The head-wearable electronic device of claim 12, wherein a weight ratio of a left portion and a right portion of the frame, on which the first and second lenses are mounted, with reference to a central portion is 5:5.

14. The head-wearable electronic device of claim 1, wherein, as the display module is moved inside the body section, the position of the display module is changed in relation to the frame.

15. The head-wearable electronic device of claim 14, wherein the guide section comprises:
a first sliding unit extending along a longitudinal direction of the body section; and
a second sliding unit connected to the display module and configured to be slid along the first sliding unit.

16. The head-wearable electronic device of claim 15, wherein the guide section further comprises:
a first stop portion formed on the first sliding unit; and
a plurality of second stop portions provided on the second sliding unit,
wherein, as the second sliding unit is moved, the first stop portion is selectively coupled with one of the second stop portions.

17. The head-wearable electronic device of claim 16, wherein the first stop portion is formed as a lug, and
wherein the second stop portions are formed by openings, each of which has a shape corresponding to a shape of the lug.

* * * * *